United States Patent [19]
Spiess

[11] Patent Number: 5,264,854
[45] Date of Patent: Nov. 23, 1993

[54] MULTIPLE VEHICLE IDENTIFICATION AND CLASSIFICATION SYSTEM

[76] Inventor: Newton E. Spiess, 1379 SW. Albatross Way, Palm City, Fla. 34990

[21] Appl. No.: 850,423

[22] Filed: Mar. 12, 1992

[51] Int. Cl.⁵ .............................................. G01S 13/80
[52] U.S. Cl. .................................... 342/44; 342/51
[58] Field of Search ................... 342/42, 43, 44, 50, 342/51

[56] References Cited

U.S. PATENT DOCUMENTS

| | | | |
|---|---|---|---|
| 3,626,413 | 12/1971 | Zachmann | 342/104 |
| 3,670,327 | 6/1972 | Clare | 342/104 |
| 3,914,762 | 10/1975 | Klensch | 342/44 |
| 3,964,024 | 6/1976 | Hutton | 342/44 |
| 3,981,011 | 9/1976 | Bell, III | 342/44 |
| 4,001,822 | 1/1977 | Sterger | 342/51 |
| 4,006,477 | 2/1977 | Yost, Jr. et al. | 342/51 |
| 4,020,490 | 4/1977 | Millard | 342/115 |
| 4,104,630 | 8/1978 | Chasek | 342/44 |
| 4,113,382 | 9/1978 | Freudenschuss | 342/50 X |
| 4,151,525 | 4/1979 | Strauch et al. | 342/46 |
| 4,180,815 | 12/1979 | Hill | 342/43 |
| 4,236,140 | 11/1980 | Aker | 342/115 |
| 4,319,244 | 3/1982 | Hirota | 342/104 |
| 4,339,753 | 7/1982 | Mawhinney | 342/44 |
| 4,740,792 | 4/1988 | Sagey et al. | 342/457 |
| 4,786,907 | 11/1988 | Koelle | 342/51 |
| 4,818,998 | 4/1989 | Apsell et al. | 342/44 |
| 4,899,158 | 2/1990 | Saeki et al. | 342/44 |
| 4,908,627 | 3/1990 | Santos | 342/125 |
| 4,937,581 | 6/1990 | Baldwin | 342/51 |
| 5,016,017 | 5/1991 | Kodera | 342/115 |
| 5,070,334 | 12/1991 | Commissaire et al. | 342/43 |
| 5,091,917 | 2/1992 | Udd et al. | 342/44 X |
| 5,124,699 | 6/1992 | Tervoert et al. | 342/44 X |

OTHER PUBLICATIONS

Merrill J. Skolnik, Radar Handbook 2nd Ed. 1990.

*Primary Examiner*—John B. Sotomayor

[57] ABSTRACT

An interrogator-transponder system in which multiple vehicle mounted transponders, which may be closely spaced in distance and moving at similar velocities, respond to an interrogation signal in a sequential or random sequential manner so as to reduce response signal interleaving to an acceptable level. The response signals include a vehicle identification code and are processed by the interrogator to yield data, for example, on specific vehicle speed, distance from the interrogator, vehicle wanted for investigation, and vehicle with an inoperative transponder.

7 Claims, 2 Drawing Sheets

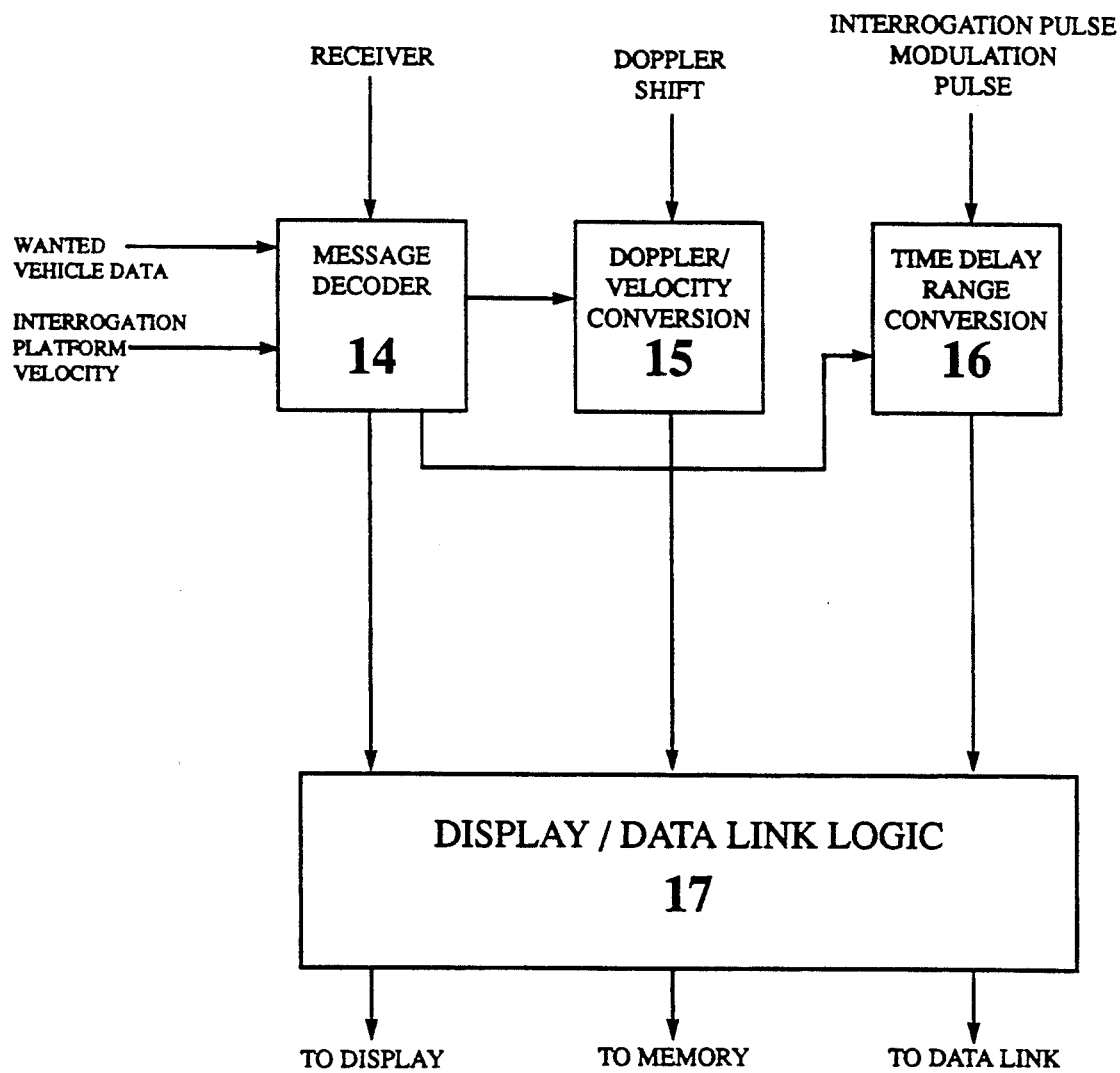

MULTIPLE VEHICLE IDENTIFICATION AND CLASSIFICATION SYSTEM

BACKGROUND OF THE INVENTION

There are well in excess of 100 million vehicles licensed to operate on the highway of the United States. At any one time there are in excess of 100,000 of these that are wanted for investigation for any one of many reasons. They may have exceeded established speed limits, be operating with stolen license plates or have been at the scene of any one or more of many criminal activities. At the present time license numbers of vehicles wanted for investigation are distributed to local police who by reference to printed or computerized lists scan traffic visually as they encounter in the course of their normal duties. Their task is complicated by the fact that, on a busy multi-lane highway, some 176 cars can pass a given observation point each minute. As a result the probability of intercepting a wanted vehicle has been very low.

There have been many attempts to automate the surveillance by equipping each vehicle with a transponder device that responds to an interrogation signal by emitting a code that is unique to each vehicle in the environment. These interrogation responses were to be presented to an operator who no longer would rely on visual observation. These approaches have failed because of the high density of vehicles on highways, particularly in urban areas, and by the sheer volume of data that would be presented to the human observer. For example, on a major highway there can be many more than 90 vehicles within ½ mile of an interrogation device and in a multi-lane environment, many of them will be at the same or nearly the same range and at the same or nearly the same relative velocity with respect to the interrogation device. It is therefore not possible to discriminate them on the basis of two-way signal transit time (radar time) or on the basis of doppler frequency difference. The response codes become hopelessly interleaved and many vehicles are either not identified at all or are misidentified.

SUMMARY OF THE INVENTION

It is the object of the present invention to solve these problems by reducing the response rate of the transponder-equipped vehicles by a factor that might typically be, on average, 500:1 and, by randomizing the responses from a particular vehicle in time, to reduce transponder code interleaving to a negligible level, all while retaining the vehicle identification, speed and range information of the data stream. This invention may be applied to transponder devices that respond to an interrogation pulse or to ones that free run on a randomized basis whenever they are illuminated.

It is a further object of this invention to reduce the amount of data that is presented to the operator, stored in memory, or that is transmitted to higher authority by rejecting information that is not of interest prior to its display, storage, or transmission.

It is a further object of this invention to alert the operator when vehicles are observed that do not have operable transponders.

The system of the present invention utilizes a transponder device whose coded responses are randomized in time and an interrogation device that processes these returns to provide vehicle identification, speed, location, and transponder status information on selected vehicles to an operator or for storage in memory or for transmittal to higher authority.

The system has the added advantages of significantly reducing the power requirements of the transponder device. It makes use of low cost, relatively low frequency electronic components and can be adapted to work in conjunction with existing police radar equipment.

BRIEF DESCRIPTION OF THE DRAWINGS

FIG. 2 shows the functions performed and the flow of information through the Decoder/Digital Processor and its outputs to the external environment.

DETAILED DESCRIPTION

Figure 1:
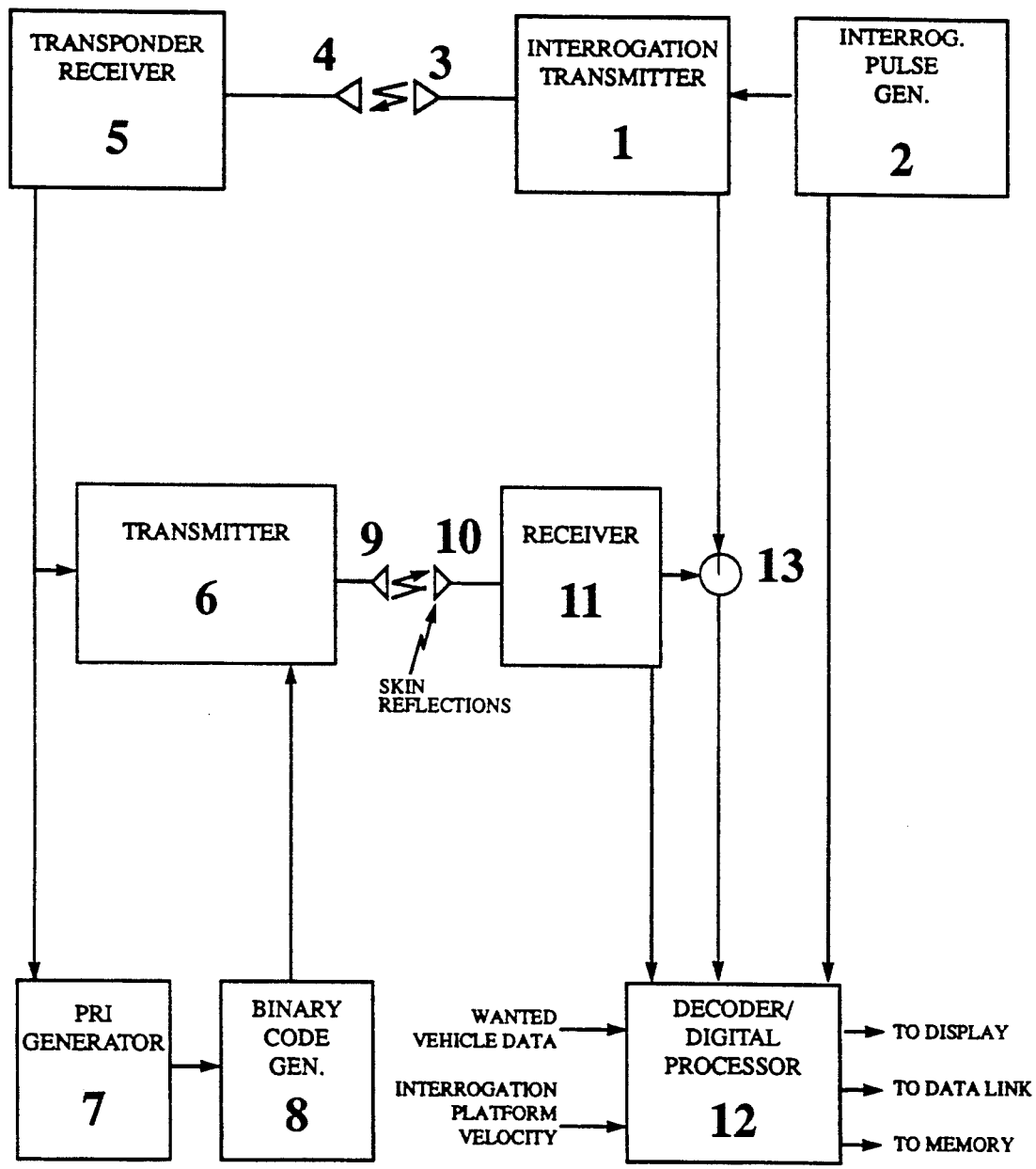
FIG. 1 is a schematic drawing showing the flow of signals and information through the system.

Referring now to FIG. 1, the interrogation transmitter 1 operates in one of two possible modes. In its primary mode 1, its output is modulated by the interrogation pulse generator 2 at a rate that is consistent with the desired range of the device and the need to minimize second time around returns. For example, as is typical of radar technology, the interrogation pulse repetition interval for a desired range of one statute mile using radio frequencies might be approximately three times the two-way travel time of the transmitted signal or 35$\mu$ sec. This would yield a pulse repetition rate of approximately 25,000 per second.

In its secondary mode 2, the transmitter 1 is not modulated by the interrogation pulse generator and outputs a free running signal that, for example, might be typical of a traffic radar.

In either mode 1 or mode 2, the output of transmitter 1 is radiated through antenna 3 and is received by a plurality of antennas 4, each one mounted on a vehicle that is licensed to operate in the environment and that is operating within range of the interrogation system.

A transponder receiver 5 is fed by antenna 4. An amplified signal from 5 is fed to a transmitter 6 which is normally "off" and to a PRI generator 7. When the signal level from transponder receiver 5 exceeds a threshold level, the PRI generator 7 performs one of two functions before generating an output to the binary code generator 8.

In its primary mode 1, the PRI generator 7 counts interrogation pulses until a number N have been received. After N pulses have been received, the PRI generator 7 triggers the binary code generator 8 on the next interrogation pulse that is received. The binary code generator 8 then keys the transmitter 6 and modulates its output with a binary code that is unique to the individual vehicle. After each PRI generator output, this unit begins to count interrogation pulses until a new N is reached. At this point the cycle repeats. The transmitter 6 and its binary code output are therefore synchronized to the interrogation pulses but the transmitter 6 is activated for only 1 in N+1 interrogation pulses.

The number N will vary from binary code output to binary code output and from vehicle to vehicle. It may most easily be generated within the PRI generator by a random number generator that outputs random numbers of integer values between, for example, 1 and 1,000. In this example the transmitter 6 will, on an average, generate an output every 500th interrogation pulse. If the interrogation pulse repetition rate is 25,000 per second, then the average pulse repetition rate of the transponder will be 50 per second. If 50 vehicle transponder units are responding to a given interrogator, there will be only 50 chances in 1,000 or 5% of the time that a given vehicle will transpond during an interrogation pulse interval that has already been selected by another vehicle.

There will therefore be approximately 47 valid vehicle binary codes per second being radiated by a single vehicle antenna 9 and received by interrogator antenna 10.

The selection of algorhythms for generation of the number N will vary depending on the particular application. The only requirement is that the response sequence of the transponder be reduced to a level where interference between transponding vehicles is reduced to an acceptable level.

When the interrogation transmitter is operating in its secondary mode 2, the system operates in similar fashion except that interrogation pulses will not be received by PRI generator 7.

When the PRI generator 7 senses this situation, it triggers the binary code generator 8 using the same random values of N that were used in mode 1. In this mode the time between trigger pulses and therefore between transmission of binary codes through antenna 9 is equal to N multiplied by a preset number; for example, $35\mu$ sec. The distribution of responses in time will be essentially the same as in mode 1.

In either mode 1 or mode 2, energy radiated by antenna 9 is received by antenna 10 along with energy reflected from the vehicles themselves. In other mechanizations the functions of antennas 9 and 10 may be combined with those of antennas 3 and 4. This energy is amplified in receiver 11 and is input to the decoder/-digital processor 12 and to the non-linear detector 13 where it is combined with energy directly from the interrogation transmitter 13. The output of 13 is an audio frequency that is a function of the closing velocity of the interrogation platform and the transponder-equipped vehicle. The interrogation pulse train, if any, from the interrogation pulse generator 2 is also input to the decoder/digital processor 12.

FIG. 2 illustrates the functions performed by the decoder/digital processor 12.

In either modes 1 or 2 the system is initialized by entering data on vehicles that are wanted for investigation into the interrogator memory. This data includes, but is not limited to, the vehicle identification code and a code that indicates the reason the vehicle is wanted, for example, stolen vehicle, stolen license plate, involved in criminal activity, etc.

In primary mode 1 receiver outputs are input to the message decode-deinterleave element 14 along with velocity data from the doppler/velocity conversion element 15 and interrogation vehicle velocity data. Element 14 performs the following functions:

1-binary code data is verified and data that does not pass validity checks is rejected;

2-valid binary code data is compared to stored wanted vehicle data and where there is agreement, a vehicle identification message and wanted code is output to the display/data link logic; and 3-velocity data from each interrogation pulse interval is compared to a velocity criteria and where the velocity exceed criteria, a vehicle identification message including the velocity is transmitted to the display/-data link logic 7.

The time delay range conversion element 16 performs the following functions:

1-The time difference between the interrogation pulse and the start of the binary code data block is corrected for known time delays in the system and converted to a distance between the interrogation platform and the transponding vehicle. This information is input to the display/data link logic 17 along with the vehicle identification code.

2-In low density vehicular traffic environments where there is a significant distance between transponding vehicles, the skin reflection return times are compared to the interrogation pulse times and the resulting range data is compared to ranges derived from binary code data ranges.

Where a vehicle skin return is detected and there is no corresponding binary code at that range, a special message is generated that indicates the range to an inoperative transponder.

In secondary mode 2, no interrogation pulse is input to the time delay range conversion element 16. When lack of an interrogation pulse is sensed by 16, this element outputs a "no range available" signal to the display/data link logic.

The output message formats from the display/data link logic and the decision as to whether they should be displayed, stored in memory or data linked to higher authority is at the option of the user authority. In mode 1, vehicle identification, associated vehicle speed and range, wanted code (stolen vehicle, excessive speed, etc.) and "inoperative transponder" code are available. In mode 2, range and "inoperative transponder" code are unavailable.

What is claimed and desired to be secured by Letters Patent is:

1. An interrogator transponder system for electronically interrogating multiple closely spaced vehicles including at least one interrogating device which transmits a sequence of identical interrogation signals, said interrogating device being located remotely from multiple vehicles and transponder means on each vehicle for receiving the interrogation signals and responding at the same frequency as the received interrogation signals at a time that is precisely synchronized with an interrogation signal after a number of interrogations have been received and means in the transponders to insure that each transponder responds to a different sequence of interrogation signals after a plurality of interrogation signals have been received.

2. An interrogator transponder system according to claim 1 wherein, after a transponder response, means in the transponder cause the transponder to not respond to interrogation signals until n interrogation signals have been received where n is a random number greater than 2 and transponder means generate a new random number n after each response.

3. The interrogator transponder system according to claim 1 wherein the vehicle transponders include means for modulating each response with an identifying code that is unique to each individual vehicle transponder and means in the interrogation device for receiving the transponder response and means for validating the received transponder identifying codes, means for rejecting codes that do not meet validity checks and means for associating each transponder response doppler derived velocity and each transponder response time delay derived range with the corresponding valid transponder identifying code.

4. An interrogator transponder system according to claim 3 in which the interrogation device includes means for comparing received valid transponder identifying codes with codes stored in the interrogator memory and means for generating an output of all received codes that are found to be the same as codes in said interrogator memory.

5. An interrogator transponder system according to claim 3 in which the interrogation device includes means for comparing each doppler derived transponder velocity with a velocity criteria, and means for generating an output of all velocities that exceed the velocity criteria along with the identifying code associated with that velocity.

6. An interrogator transponder system according to claim 3 in which the interrogation device includes means for receiving the skin reflection from moving vehicles, means for determining the time delay between transmission of an interrogation signal and reception of a skin reflection, means for converting this time delay into a range value and means for generating an output if there is no transponder-derived range that is substantially the same as the skin reflection-derived range.

7. An interrogator transponder system according to claim 3 in which the interrogation device includes means for receiving the skin reflections from moving vehicles, means for determining the range and velocity of the vehicles based on received skin reflections and means for generating an output if there is no transponder-derived range and velocity of substantially the same value as the skin reflection values.

* * * * *